Figure 1:
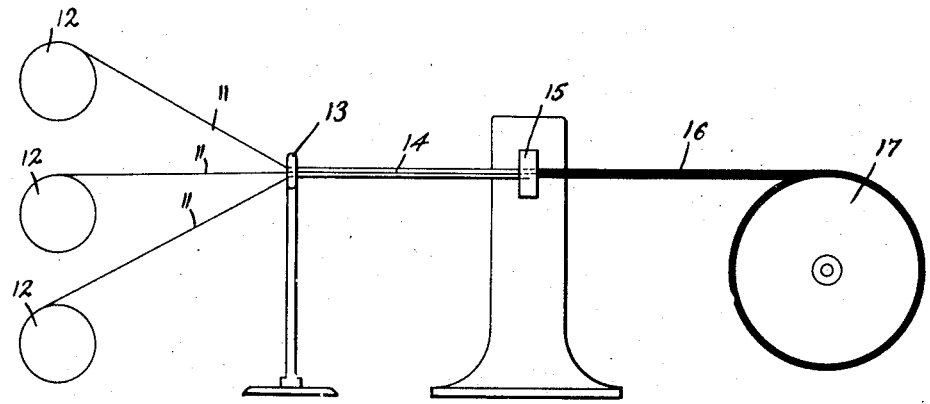

Jan. 9, 1934.  W. G. LERCH  1,943,274

TIRE BEAD

Filed July 22, 1932

INVENTOR.
William C. Lerch
BY
Fay, Oberlin & Fay
ATTORNEYS

Patented Jan. 9, 1934

1,943,274

UNITED STATES PATENT OFFICE 1,943,274

TIRE BEAD

William G. Lerch, Akron, Ohio, assignor, by direct and mesne assignments, to National-Standard Company, Niles, Mich., a corporation of Michigan Application July 22, 1932. Serial No. 624,041

15 Claims. (Cl. 154—14)

This invention relates to automobile tire beads and to methods of making the same and is, in some respects, a further and distinct development of the inventions set forth in copending applications, Serial No. 552,401, filed July 22, 1931, and Serial No. 611,001, filed May 13, 1932.

In tire beads, as known prior to the inventions set forth in the above identified applications, the practice has been to insert reinforcing wires in the bead by first arranging such wires side-by-side in the form of a tape held together by a coating of rubber composition, or to use metallic strands built up by weaving, sometimes in the form of a flat braid, and sometimes in the form of a twisted or weft-bound cable. It has also been proposed to tie a number of wires together in a bundle by means of another wire wrapped therearound in spiral fashion. All of these methods and their various modifications have been unsatisfactory for the reason that in practice it has been impossible with tape or braid or tie wires to maintain the reinforcing elements throughout the successive stages of manufacture in the regular and predetermined arrangement desired, so as to form a properly disposed skeletal reinforcement correctly related to the final shape of the bead and, at the same time, in which all of the elements of the reinforcement contribute equally and directly to the strengthening of the bead.

As set forth in the above mentioned applications, it has been found that the flat tape type of reinforcement is unsatisfactory for several reasons among which may be mentioned that it is difficult to position the tapes so that a triangular cross-sectional arrangement of the reinforcing wires is maintained. If not maintained, the bead tends to rock sideways on its base, causing the tire to rim cut. To avoid the objectionable features of the flat tape type of reinforcement, I have devised a bead reinforcement built up from wires grouped in substantially cylindrical form and held together by means of a coating of rubber or other suitable adhesive material. The cables thus formed are then built up into the requisite triangular form by appropriate means. In building up beads in this manner, it has been considered necessary either to coat each individual wire with rubber, or the like, before incorporating a number of them into a cable or else to cause the rubber to flow between the individual wires of a cable group in the process of forming such cable. It has now been found that a tire bead may be built up rapidly and inexpensively by employing bare wires which contact with each other within a cable group while being held together by surrounding rubber, or like material, and that a tire bead so constructed gives better performance characteristics after the tire has been put in service due to the fact that the mass of wire in the tire bead stays fixed in position, and there is not the same tendency of the separate wires to "float" within the bead structure.

It is, accordingly, an object of the present invention to provide an improved tire bead reinforcement and an improved method of forming such tire beads. To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

Figure 2:
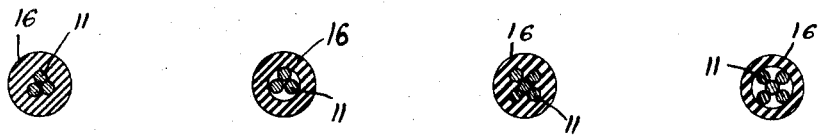
Figure 3:
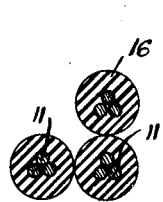
Figure 4:
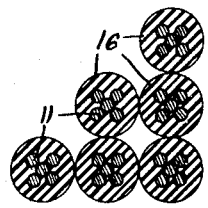
Figure 5:
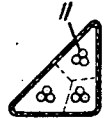
Figure 6:
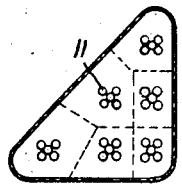

In said annexed drawing:

Fig. 1 is a diagrammatic side elevation of an apparatus for making the improved bead; Fig. 2 illustrates a number of forms which the new and improved cable may take; Figs. 3 and 4 are sections through two lay-ups of cables in the course of formation of the bead; and Figs. 5 and 6 are diagrammatic sections through completed beads corresponding to Figs. 3 and 4, respectively.

In the preferred method of manufacturing, a plurality of bare reinforcing wires 11 are fed from sources of supply, such as the reels 12, through a forming ring 13 by which they are grouped, as shown at 14, into the parallel relation which they are to retain in the finished reinforcing cable shown in Fig. 2. The group of parallel wires is then passed through a die-former and insulating head 15 where the group is coated as a unit with a plastic compound 16, unvulcanized rubber being the material ordinarily used. The cable thus formed from the individual wires is then drawn from the die-former onto a bead former 17, where the bead is laid up in turns and layers as will be brought out more at length hereinafter.

When the individual wires pass through the forming ring 13, they may assume any of the groupings shown in Fig. 2 wherein each wire contacts with other wires in its group and this arrangement is maintained in the die-former and insulating head 15 where the coating 16 of plastic material, such as rubber, is applied. The pressure in the insulating head may be varied so as either to bring the rubber closely around the wires, but without pressing the rubber in between the wires or, the pressure can be reduced so as only to bring the rubber around the wire grouping while leaving unfilled spaces in the core. Practically, either arrangement illustrated in Fig. 2 may be employed provided only that the individual wires are left in metallic contact with each other, since the shape of the cable is ultimately deformed in building up the tire bead.

It will thus be seen that a cable has been built up consisting of a core of bare wires in contact with each other and surrounded and held in parallel contactual relation by means of the coating of rubber or similar material applied in the insulating head. This cable is then laid up in turns and layers on a bead former 17 where the cable turns of each layer are placed against each other and the layers are placed one above the other with the corresponding turn of each layer approximately above the turn below, as shown in Figs. 3 and 4 of the drawing. Each layer is narrowed by having fewer outer turns than the layer immediately below, each layer usually containing one less than the next lower layer and the turns and layers being built up from one continuous cable. It will be seen that the cable turns are so laid up that a transverse section through the turns laid up ready to be compressed into a bead shows a right triangular arrangement of cable turns regularly placed. Beads for tires of various sizes can be made either by varying the size of the cables or the number of cable turns or both. Of course, the number of individual wires in a cable can be varied as desired and the arrangement of the wires within the cable may also be varied to some extent.

On account of the nature of the unvulcanized rubber or similar plastic material, when the completed bead is built into the tire constructed by this process the wires 11 maintain the same relative positions therein as they occupied in the forming process only being further compressed by the regular hydraulic or mechanical and internal pressure used in vulcanization.

The advantages of thus employing bare wires which are maintained in metallic contact by the sheathing of rubber placed around them is that the problem of grouping the wires properly is much simplified and the number of wires within each group may be varied with greater facility since it is not necessary to insulate each separate wire before assembling it with its fellows into a cable. A cable group of bare wires can be easily run through the forming ring 13 and then covered with a sheathing of rubber in the insulating head 15 with a minimum number of operations. By varying the pressure in the insulating head, as by crowding the wires through a small die, the rubber may either be forced between the outer wires to a certain extent, but without separating the wires from contact with one another, or, by lessening the pressure by using a larger die a looser sheath or wrapper of rubber may be applied, although in any case, the rubber will be so applied as to hold the wires securely.

It is found that tire beads formed in this manner from groups of wires in close contact with each other and without any separating rubber have more stable characteristics after the tires containing the wires are cured under pressure, that is to say, the mass of wire incorporated in the bead is better fixed in position and there is less tendency for the wires to move within the mass of the bead. In a bead so made there is a lesser tendency for the wires to float and a more rigid bead structure results. Of course, it is well understood that the wire reinforcements in tire beads should maintain, as nearly as possible, a regular and uniform position in the triangular cross-section of the bead in order to preserve the triangular shape of the bead and insure that the tire will seat firmly on the rim without a tendency to rock. Better fixation of the wire reinforcements in the tire bead, as secured by the present method, aids in achieving this result.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A method of forming material for the reenforcement of tire beads which comprises grouping a plurality of bare wires in paraxial contacting arrangement and molding a covering of a flexible plastic composition in intimate contact with the individual wires of the grouping, binding the same in the form of a cable, while leaving the individual wires in contactual relation.

2. A method of forming material for the reenforcement of tire beads which comprises grouping a plurality of bare wires in paraxial contacting arrangement and molding a covering of a flexible plastic composition in contact with the grouping so formed to bind the wires in the form of a cable, said covering contacting only the radially outermost points of said grouping.

3. A method of making reenforced tire beads which comprises forming a group of bare wires into a distinct rubber-covered and bound cable in which the individual wires are in contact with each other, and winding said cable on a bead-former in layers concentric with the base of the bead, said layers successively diminishing upwardly in width.

4. A method of making reenforced tire beads which comprises forming a distinct group of bare wires, the wires in the group being in contactual relation and surrounding the group of wires with a rubber sheath or tube to form a cable, winding said cable on a bead-former in layers concentric with the base of the bead, said layers successively diminishing upwardly in width and the top layer consisting of a single turn of the cable.

5. A method of making reenforced tire beads which comprises forming wires into distinct cable grouping by enclosing said wires collectively in a single covering of plastic material in which the individual wires are directly in mutual contact, and winding said cable turns on a bead-former in layers concentric with the base of the bead, said layers diminishing successively upwardly in width.

6. A method of making reenforced tire beads which comprises forming wires into distinct groups having the individual wires in direct contact with one another, forming said groups into a distinct rubber-covered and bound cable, and winding said cable on a bead-former in layers concentric with the base of the bead, said layers diminishing successively upwardly in width.

7. A method of making reenforced tire beads which comprises forming distinct groups of wires into a distinct rubber-covered cable having the individual wires of a group bound in parallel contact by said rubber and winding said cable on a bead-former in flat layers concentric with the base of the bead, said layers diminishing successively upwardly in width, the top layer consisting of a single turn of the cable.

8. A method of making reenforced tire beads which comprises forming wires into a distinct group having the individual wires in parallel contactual relation, maintaining such group in a supporting material which is also the binding agent for such group, winding said group on a bead-former in flat layers of successively upwardly diminishing width, and compressing said group turns into compact relationship without materially altering the relation within the group turns.

9. A method of making reenforced tire beads which comprises forming distinct groups of wires into a distinct rubber-covered cable having the individual wires of a group bound by such rubber in parallel contactual relation, and winding said wire on a bead-former in flat layers concentric with the base of the bead, the inner edges of all layers being in a common plane perpendicular to the base, and the outer edge being retracted from the outer edge of the layer below by the omission of a cable turn.

10. A tire bead reenforcement comprising a plurality of bare wires grouped in paraxial contacting relation and a covering of a flexible plastic composition formed around said wires to bind the same into a cable, said flexible plastic composition being forced into intimate contact with the individual wires of the cable while leaving the same in metallic contact with each other.

11. A tire bead reenforcement comprising a plurality of bare wires grouped in paraxial contacting relation and a covering of a flexible plastic composition formed around said wires to bind the same into a cable, said flexible plastic composition being brought into contact only with the radially outermost points of said wire grouping.

12. A tire bead reenforcement comprising a plurality of cable turns laid side by side in layers of successively diminishing width, said cable turns being each composed of a plurality of wires all in parallel contactual relation, formed by a rubber composition into a unitary strand and embedded in said strand.

13. A tire bead reenforcement comprising a plurality of cable turns arranged side by side without voids in layers of successively diminishing width, said cable turns each being composed of a plurality of contacting wires, all in parallel relation and bound by a rubber composition into a unitary strand and embedded in said strand, said cable turns being held together by the properties of said composition.

14. A tire bead having wire reenforcing elements arranged in individual paraxial cylindrical groups, all of the wires in each of said groups being parallel and in contactual relation and being consolidated by a plastic compound, said groups being arranged in parallel arrangement in layers, and said layers being arranged in superposed concentric relationship, each layer being narrower than the one below it.

15. A tire bead reenforcement comprising a plurality of distinct group turns of wires, each individual wire being parallel to and in contact along its length with other wires in its group, said group turns being laid around the bead in superposed layers, each layer having fewer group turns than the one below, and the cross-sectional outline of said plurality of group turns conforming to the cross-sectional outline of the finished bead.

WILLIAM G. LERCH.